March 19, 1929.　　S. J. MARBURGER　　1,705,580
LIQUID DISPENSING APPARATUS
Filed July 26, 1927　　2 Sheets-Sheet 2

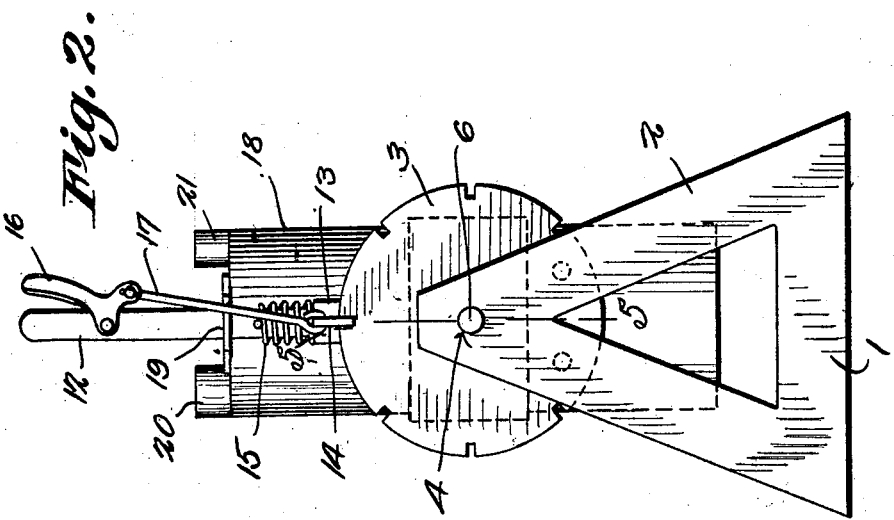
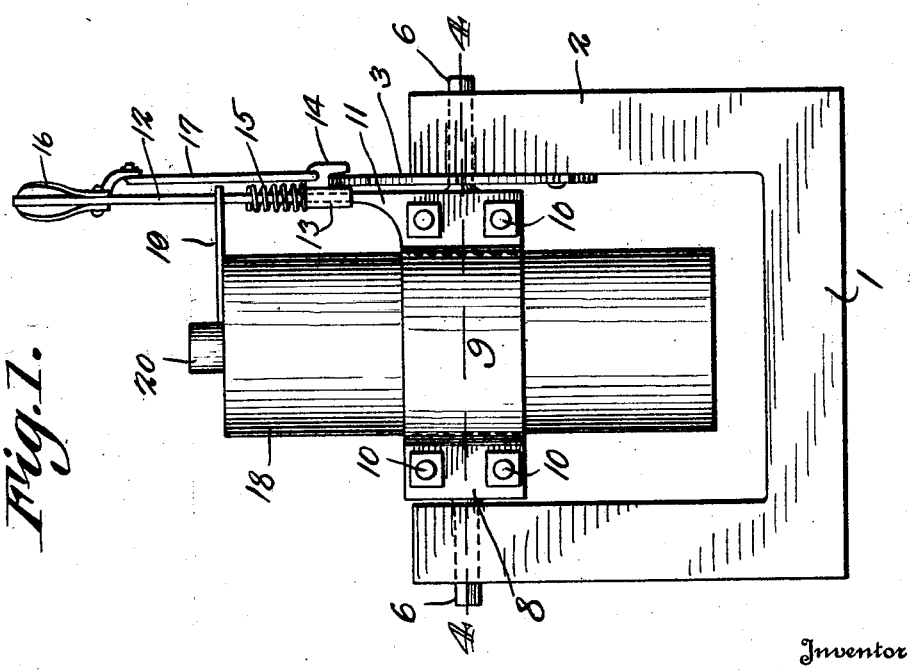

Inventor
S. J. Marburger
By C. A. Snow & Co.
Attorneys.

Patented Mar. 19, 1929.

1,705,580

UNITED STATES PATENT OFFICE.

SAMUEL J. MARBURGER, OF LAMBERTON, MINNESOTA.

LIQUID-DISPENSING APPARATUS.

Application filed July 26, 1927. Serial No. 208,582.

This invention relates to apparatus for dispensing liquids, one of the objects being to provide a drum mounted for rotation about a transverse axis and having means whereby it can be rotated in opposite directions to bring either of two outlets to delivering position.

A further object is to provide simple and efficient means for holding the drum in any position to which it might be moved.

With the foregoing and other objects in view which will appear, as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings,

Figure 1 is a front elevation of the apparatus.

Figure 2 is a side elevation thereof.

Figure 4:
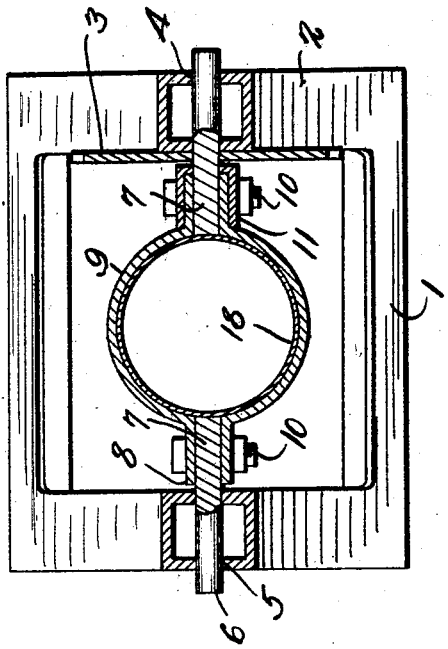
Figure 4 is a section on line 4—4, Figure 1.
Figure 6:
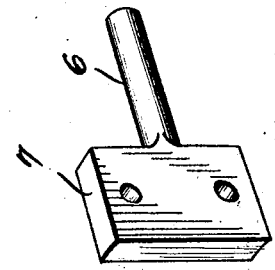
Figure 6 is a detail view of one of the trunnions.
Figure 3:
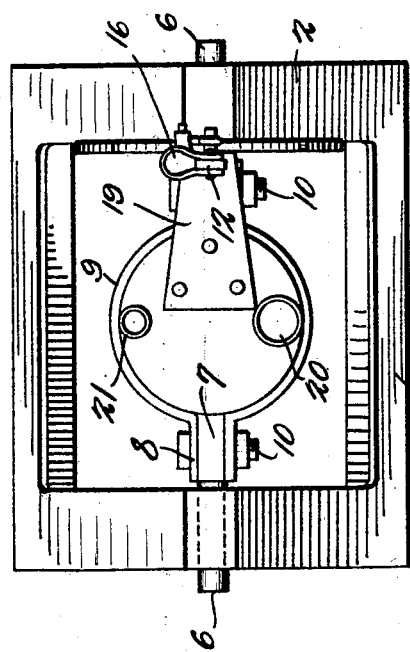
Figure 3 is a top plan view.
Figure 5:
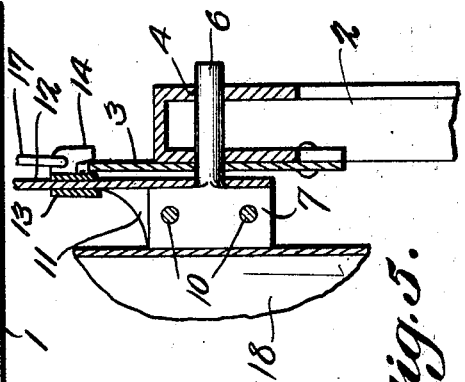
Figure 5 is a section through a portion of the structure on line 5—5, Figure 2.

Referring to the figures by characters of reference 1 designates the base of a frame having upwardly tapered standards 2 at the sides thereof, there being a notched disk 3 attached to the upper portion of one of the standards and concentric with an aperture 4 formed in said standard. A similar aperture is provided in the opposed standard as shown at 5 and these apertures are adapted to receive alining trunnions 6 each of which is provided at its inner end with an integral flat head 7. The two heads are interposed between outturned ears 8 provided at the ends of arcuate bands 9 and bolts 10 extend through these ears and head for the purpose of binding them together. Two of the ears adjacent the disk 3 are straddled by the channeled end 11 of a lever 12, said channeled end being held in place by the adjacent bolts 10. The lever 12 projects a desired distance from the trunnions 6 and has a sleeve 13 slidable thereon. This sleeve carries a dog 14 adapted to rest in any one of the peripheral notches in disk 3. A spring 15 is mounted on the lever and thrusts against the sleeve as shown. A small hand lever in the form of a bell crank 16 is connected to lever 12, this bell crank in turn being connected to the dog 14 by a rod 17.

A container in the form of a drum 18 is gripped at its center between the bands 9 and extending laterally from one end of this container is a wing 19 through which the lever 12 extends. Extending from the same end of the container at diametrically opposed points are outlet spouts 20 and 21, these spouts being of different diameters.

In practice the container or drum 18 is filled with the liquid to be dispensed and left in an upstanding position as shown in the drawings. If the liquid is of a viscous nature tending to thicken in cold weather, it can be dispensed through the large spout 20 when thickened and through the smaller spout 21 when the weather is warmer and the liquid flows more freely. For the purpose of bringing either of these outlet spouts to lowermost position lever 12 is actuated, the container rotating about the axis of the trunnions 6 until brought to a desired angle where it can be held by means of the dog 14 which engages in the adjacent notch in disk 3. By having the lever extended through wing 19 the container can be swung readily and there is no danger of the lever being twisted or shifted relative to the container.

What is claimed is:

1. In a dispensing apparatus the combination with a supporting structure and alining trunnions journaled therein, each trunnion having a head, of a container, opposed bands embracing the container and clamped thereto and to the heads, a lever fixedly connected to the bands and extending radially from the axis of the trunnions, a connection between the lever and one end of the container, and cooperating means upon the lever and supporting structure for holding the container tilted to any desired angle.

2. The combination with a supporting structure and a notched member fixedly connected thereto, of trunnions journaled in said structure having heads at their inner ends, a container, opposed bands clamped upon the heads and container, a lever clamped upon one of the heads and extending radially from its trunnion, means extending from one end of the container and engaging the lever to hold the lever and container against relative movement, and means carried by the lever and engaging the notched member for holding the container at a predetermined angle.

In testimony that I claim the foregoing as my own, I have hereto affixed my signature.

SAMUEL J. MARBURGER.